Aug. 16, 1966  MICHAEL M. KAMIMOTO  3,266,603
EXTREME ENVIRONMENT HERMETICALLY SEALED DAMPER
Filed Feb. 24, 1965
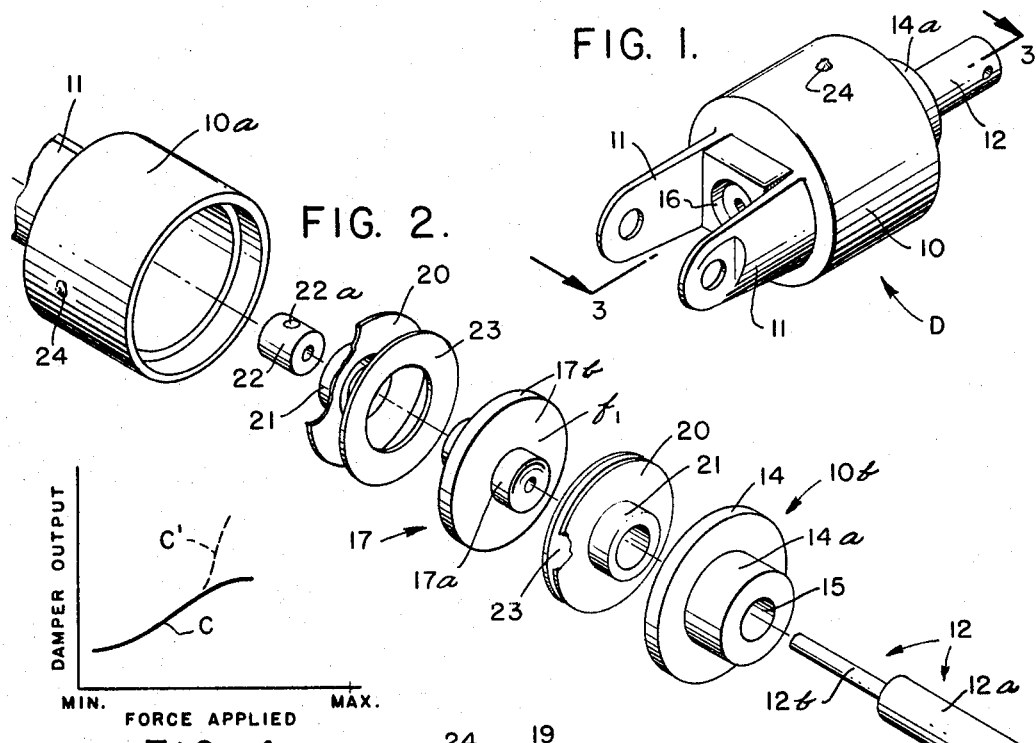
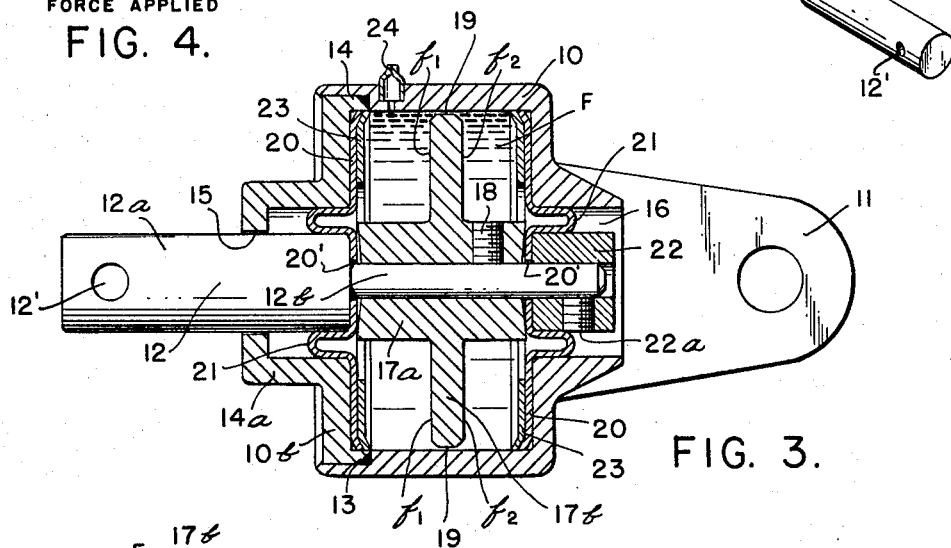
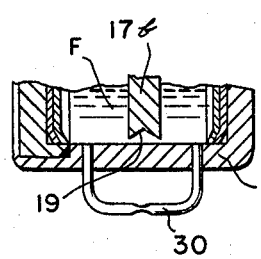
INVENTOR.
MICHAEL M. KAMIMOTO
BY
P. H. First
ATTORNEY.

3,266,603
EXTREME ENVIRONMENT HERMETICALLY SEALED DAMPER
Michael M. Kamimoto, China Lake, Calif., assignor to the United States of America as represented by the Secretary of the Navy
Filed Feb. 24, 1965, Ser. No. 435,411
7 Claims. (Cl. 188—100)

The invention described herein may be manufactured and used by or for the Government of the United States of America for governmental purposes without the payment of any royalties thereon or therefor.

The instant invention relates generally to motion attenuation devices, commonly called dashpots or dampers, and more particularly to a hermetically sealed, volume-compensating, piston-type damping device, which in operation exhibits the characteristics of a viscous as well as a hydraulic damping device.

Dampers can be classified according to two basic principles of dissipating energy, i.e., viscous and hydraulic pumping. Viscous dampers dissipate energy by employing input forces for shearing a viscous fluid between two adjacent surfaces as one surface is displaced in a parallel direction with respect to the other surface. Hydraulic dampers, on the other hand, dissipate input energy by employing input forces for pumping a hydraulic fluid from one sealed chamber to another.

Conventional piston-type hydraulic dampers normally include a piston head attached to an input shaft, whereby input forces may be axially applied to the shaft for thus initiating a reciprocation of the head. Reciprocation of the head serves to displace a quantity of hydraulic fluid through a metering port or like device, whereupon the input energy is dissipated in displacing the fluid through the port. The velocity of the reciprocating head, and therefore the quantity of energy dissipated, is generally controlled by metering the flow of the displaced fluid to a desirable rate.

While the fundamental concept of piston-type dampers is simple and notoriously old, designers of such dampers are faced with numerous limitations. One of the more serious problems confronting designers of such devices is that of establishing a seal which is effective over wide pressure and temperature ranges. This is particularly true where the damper must be subjected to conditions normally found in rocket and missile fields where ambient temperatures vary over a very wide range, for example, the temperatures may in a single operation, vary between −65° F. and 250° F. Quite often, the encountered temperature range for various surfaces of the missile will be much greater.

Normally, piston-type dampers utilize at least two sealing components, one of which may be formed of a resilient material, forced into contiguous face-to-face sealing engagement for thus establishing a fluid seal therebetween. In operation, the effectiveness of the thus established seals will be severely reduced under conditions where the damper is operatively subjected to changing fluid pressures, and where one of the sealing components must be operatively displaced relative to the other to effect operation thereof. As a consequence, leakage in damping systems is known to be quite common. This inadequacy leads to various design problems, since, where fluid leakage occurs, a replenishing of the fluid is necessarily required. This, of course, is undesirable in the systems such as may be found in systems employed in rocket propelled missiles wherein over-all weight is of primary importance.

If, in order to overcome leakage between two movable sealing components, an attempt is made to increase the sealing surface area or the forces applied for maintaining a face-to-face sealing engagement between the components, an undesired increase in the prevailing forces of friction will be encountered, whereby the sensitivity and efficiency of the damper will be impaired.

Further, in order to accommodate operative fluid pressure differentials, normally encountered in a missile's flight and initiated through fluid temperature changes, it has been the practice to fabricate the damper housing or fluid chamber from heavy materials which will withstand the developed fluid pressures. This construction becomes particularly critical in instances where the damper must be maintained in a completely filled state and hermetically sealed for achieving an efficient operation of the damper.

The purpose of the instant invention is to overcome the aforementioned disadvantages and to provide a simple, sensitive, lightweight, integrated damping device for use in systems which are subjected to large operative temperature differentials, varying loads, and which possess low-maintenance requirements. Briefly, this is achieved by utilizing a free-floating piston head sealed within a hermetically sealed, expandable chamber, the latter being capable of accommodating a wide range of fluid pressure differentials without impairing the efficiency of the device.

An object of the instant invention is to provide a sensitive leak-proof and hermetically sealed damper capable of accommodating a wide range of temperature differentials.

Another object is to provide simple means for positively sealing a hydraulic chamber having mechanical linkages extended thereinto.

A further object is to provide an integrated, piston-type damper having a free-floating, self-centering piston head positively seated within a hermetically sealed and expandable chamber.

Still a further object is to provide sealing means for sealing a hydraulic fluid chamber, which serves as a hydraulic fluid volume compensating device.

And yet another object is to provide an extreme environment, hermetically sealed vibration dissipating device capable of accommodating wide ranges of temperatures and pressures and possessing the operative characteristics of both viscous and hydraulic damping device.

Other objects, advantages and novel features of the invention will become apparent from the following detailed description of the invention when considered in conjunction with the accompanying drawings wherein:

FIG. 1 comprises a perspective view of an assembled damper;

FIG. 2 comprises an exploded, perspective view of the damper of FIG. 1;

FIG. 3 comprises a cross sectional view of the device of the instant invention taken generally along lines 3—3 of FIG. 1;

FIG. 4 comprises a graphic view of a reaction force curve obtainable from the damper of FIGS. 1 and 2; and FIG. 5 comprises a view of a modification of the device of FIG.1.

Turning now to the drawings wherein like reference characters designate like or corresponding ports throughout the several views, there is shown in FIG. 1 a damper D including a cylindrical, sealed housing 10 having fixed thereto a mounting yoke or clevis 11 adapted for mounting the housing 10 in a fixed relationship with respect to a structural mounting or coupling member, not shown. An input shaft 12 including an enlarged shaft portion 12a and a reduced portion 12b, FIG. 2, extends in an axial direction through the sealed housing 10. The shaft 12 is provided with suitable coupling means, such as a pin-receiving opening 12′, adapted for affording a coupling of the shaft 12 with a movable member, also not shown, the movement of which is to be attenuated by the damper D.

Turning now to FIGS. 2 and 3, the housing 10 includes an open-ended, cup-shaped shell 10a having a cylindrical internal bore. A flat disk-like cover 10b is disposed to extend transversely across the open end of the shell 10a. The cover 10b may be sealed across the opening of the shell 10a in any suitable manner, such as, for example, by a solder or friction weld. Where deemed desirable, a circular seal 13 may be employed for maintaining a fluid seal between the shell and cover, FIG. 3.

The cover 10b includes an inwardly directed peripheral lip 14 and an integrally formed, centrally disposed and axially extended cylindrical segment 14a having a closed end portion and a concentrically aligned opening 15 extending therethrough for receiving the shaft 12. The segment 14 extends outwardly from the housing 10 and has an internal diameter substantially larger than the outside diameter of the shaft 12, whereas the diameter of the opening 15 is only slightly larger than the outside diameter of the portion 12a of the shaft 12 which extends therethrough.

The end of the cup-shaped shell 10a, opposite the cover 10b, includes an opening 16 having an internal dimension approximating the internal dimension of the cylindrical segment 14a. Through this opening extends the reduced portion 12b of shaft 12. It is to be understood that the diameter of the opening 16 is substantially greater than that of the shaft 12, whereby a substantial clearance is established between the shaft 12 and the surfaces of the opening for reasons as will hereinafter be more clearly understood.

A piston head 17, including a tubular body 17a and a transversely arranged flat-surfaced disk 17b, is mounted on and fixed to the reduced portion 12b of the shaft 12 by any conventional means, such as a screw 18. The disk 17b is formed as an integral portion of the piston head 17 and extends radially from the body 17a for thus providing opposed pressure faces $f_1$ and $f_2$. The outside diameter of the disk 17b is slightly less than the inside diameter of the bore of the housing 10, whereby a ring-like opening or fluid metering passageway 19, FIG. 3, is formed between the surfaces of internal bore of the housing and the peripheral surface of the disk 17b. The disk's diameter, the thickness of the piston head, or surface area defining the passageway 19 and the shape of the passageway 19 and its exits, or the surface configuration along the periphery of the piston head 17, may be varied for altering the flow characteristics of the passageway, viz. the flow may be caused to vary between a laminar flow and a turbulent flow at various preselected fluid flow velocities, for accommodating different damping operations. For example, at a given fluid velocity a laminar flow may be established through the passageway 19 of FIG. 3, while at the given velocity a turbulent flow will be established through the passageway 19 of FIG. 5.

As more clearly illustrated in FIG. 3, each opposite end face of the tubular portion 17a of the piston head 17 is provided with a concave surface into which is seated a given diaphragm seal 20, of a pair of such seals. Each seal 20 comprises a flexible disk-shaped member formed of a woven fabric of a known geometric weave which permits the diaphragm 20 to be stretched as well as deformed. The fabric from which the diaphragms or seals 20 are formed is impregnated with a suitable sealing compound, such as, for example, one of the various well-known rubber compounds, in order that each diaphragm 20 may be operatively stretched, deformed, and "rolled" at concentric convolutions 21 formed therein and disposed to extend outwardly from the central portion thereof, in generally parallel alignment with the shaft 12. Each diaphragm 20 is further provided with a central opening 20' which accommodates a mounting of the diaphragm 20 on the reduced portion 12b of the shaft 12.

The enlarged portion 12a of the shaft 12 serves as a stop member for seating the diaphragm 20 at one end of the body 17a, while a removable collar or stop member 22 is employed to seat the diaphragm 20 at the opposite end of the body 17a of the piston head 17. The stop member 22 is provided with a convex end face having a configuration complementary to the configuration of the concave face of the adjacent end of the body 17a, and includes an opening extending axially therethrough for receiving the reduced portion 12b of the shaft 12, whereby the convex face may be disposed in a complementary relationship adjacent the concave face of the body 17a with the diaphragm 20 "sandwiched" and sealed therebetween. In practice, a set screw 22a is employed for fixing the stop member 22 to the shaft 12.

In order that the portion 12a of the shaft 12 be utilized as a stop member, the transition surface, or the shoulder surface thereof which extends between the portions 12a and 12b, must be provided with a convex configuration similar to that of the end surface of the block 22 in order that the other diaphragm 20 of the pair of diaphragms may be "sandwiched" between the piston head portion 17a and the portion 12a of the shaft 12, in a manner similar to that aforedescribed with respect to the member 22. Where desired, it is feasible to coat the end surfaces of the body 17a with a suitable cement, in order that the diaphragm seals 20 may be positively bonded to the piston head 17.

Each diaphragm 20 is secured to the housing 10 by means of a flattened metallic, resilient retainer ring 23, which serves to engage and force the adjacent diaphragm 20 into a sealing engagement with an adjacent end portion of the housing 10 in order to thus establish a fluid seal therebetween. Each retainer ring 23 is somewhat larger in diameter than the internal diameter of the bore of the housing 10 and is, in damper assembly, fitted by a forced-fit into the bore of the housing to attain a seated engagement with the innermost face of the adjacent diaphragm 20. Consequently, each of the retainer rings 23 is, in seating, flexed in an axial direction and caused to be provided with an inwardly directed or inclined peripheral portion, whereby each of the retainer rings 23 is caused to assume a concave-convex configuration having a resilient radial load applied thereto for thus causing a variable static load to be exerted at its convex surface against the adjacent surface of the adjacent diaphragm 20. The rings 23 are thus caused to exert an axially directed preloading pressure over peripheral portions of the diaphragms 20. The exerted pressure may be varied in a manner as will hereinafter be more fully described. The inner periphery of each ring 23 is spaced from the convolution 21 of its associated diaphragm 20 to permit inward flexing or "ballooning" of the diaphragm at the convolution.

It is to be understood that the internal diameter of the opening 16, of the shell 10a, and the internal diameter of the cylindrical segment 14a are such that the convolutions 21 may extend outwardly therethrough, or away from the piston head 17. Further, in operation, it is necessary that the diaphragms 20 be stretched or "ballooned," in order to accommodate the fluid volume change, consequently it will be appreciated that the convolutions 21 must be afforded a space for accommodating expansion thereof in an axial direction, as well as to accommodate a "rolling" deformation at the convolutions 21.

The assembled housing 10 is filled with a conventional silicone hydraulic fluid F, which exhibits a characteristic of near-constant viscosity over a very wide temperature range, and further exhibits shear resistance stability, and lubricity characteristics under adverse conditions of heat and oxidation.

The fluid F is introduced, by a vacuum, into the housing 10 through an elongated port or tube 24, illustrated in a closed and sealed condition, FIG. 3, in a manner such that all appreciable voids are displaced by the fluid F so that the housing 10 of the assembled damper is sealed in a fluid-filled condition. This is achieved by first introducing a vacuum in the sealed housing through the port 24 over a period of several hours and then introducing an air-free fluid F, at a preselected temperature, through the opening or port 24. The port 24 is then "crushed" and sealed for completing and sealing the damper D.

With the damper D thus assembled, in the manner hereinbefore described, it may be mounted on a fixed structural member, utilizing the yoke or clevis 11, and connected at the pin-receiving opening 12' with a movable force input means, the motion of which is to be attenuated.

Initially, the disk portion 17b of the piston head 17 will be retained in a displaced relationship with respect to the adjacent surfaces of the bore by the shaft-supporting reaction forces present within the resilient diaphragms 20. However, as displacement of the input means causes reciprocal motion to be imparted to the piston head 17, fluid pressure within the body of fluid F will increase at the leading face of the disk portion 17b of the piston head 17, due to the imparted motion of the head 17. Fluid flow through the passageway 19 is thus initiated. Floatation of the piston head 17 is then effected through existing molecular fluid film action and the balancing effects established under the prevailing Bourneuli fluid flow condition. Consequently, the friction forces normally found between the internal surfaces of damper housing 10 and the peripheral surfaces of a piston head is substantially eliminated. As the piston head 17 is caused to continue its longitudinal travel within the housing 10, along the bore thereof, the input energy is dissipated at a predetermined rate due to the transfer of the fluid F through the circular passageway 19.

It will be appreciated that as the piston head 17 is displaced along the bore of the housing 10, the convolutions 21 must "roll" for thereby accommodating the displacement of the piston head 17. The "rolling" of the convolutions 21 is enhanced by the convex-concave configuration of the surfaces employed for securing the diaphragms 20 to the shaft 12, whereby the tendency of the fabric to "break," at the junctures thereof with the shaft 12, is greatly reduced. The housing 20 normally functions as a heat sink and serves for radiating heat generated during operation of the damper D. However, its heat sink capabilities are severely limited due to its mass. Therefore, the fluid F is subjected to accelerated heating during the damper's operation.

It is to be noted that as the piston head 17 is operatively displaced, the elastic diaphragm located ahead of the piston head will be caused to "balloon" or stretch under the influence of increased fluid pressures. The elastic constant of the fabric determines the extent of experienced "ballooning" at given fluid pressures. However, recovery forces within the "ballooned" convolutions initiate a self centering displacement for the piston head 17, whereby the piston head will be caused to return to its initial position, preferably near the center of the bore, once the input force is removed. It will be further appreciated that the elasticity of the seals 20 also accommodate an input of torsional forces normally encountered when "damping" high-frequency vibrational displacement. Since the seals 20 are of an elastic nature, the piston head 17 may be operatively rotated with respect to the housing 10, as high-frequency vibration occurs, and subsequently counter-rotated under the influence of the recovery forces applied by the material of the seals. This characteristic is of significant importance in the missile field where high frequency vibration is often encountered.

When low-level input forces are applied to the shaft 12, with a given passageway 19, the velocity of the fluid flowing through the passageway 19 also will be at a low level, hence, reaction forces, or the damper's output, will increase in a substantially linear fashion, as indicated by the solid portion C of the curve line of FIG. 4, due to the viscous column damping characteristic exhibited by the damper. However, should the rate at which the input force is applied at the shaft 12 be increased, above a determinable level, the flow through the passageway 19 will be accelerated with a turbulent fluid flow being established therethrough for thereby causing the damper to exhibit hydraulic damper output characteristics whereby the reaction forces will be caused to rise along an exponential curve line, as illustrated by the dotted portion C' of the curve line. Hence, it will be understood that the damper D is sensitive to input forces of a low order, while retaining the capabilities necessary for dissipating the energy present when the input forces are of a much greater magnitude and frequency.

It is to be particularly noted that in operation the fluid F of the damper D normally will be subjected to a wide range of ambient temperatures, as well as the range of temperatures generated and retained during piston displacement, particularly where the damper is employed in the rocket and missile field. Changes in fluid temperature necessarily initiate changes in the volume of the fluid F, and though changes in dimensions of the housing 10 will result from the changes in fluid temperatures, the changes in housing dimensions will be limited and will not compensate for changes occurring in fluid volume.

Since, at filling, the fluid F is caused to displace the voids, which previously existed within the chamber 10, means must be provided for accommodating the changes initiated in fluid volume. Further, means must be provided to prohibit fluid leakage about the seals 20 under increased fluid pressure. That this is true may be more fully appreciated when it is recalled that the particular hydraulic fluid required for efficient damper operation comprises a silicon fluid which is notoriously difficult to confine under increased pressures. These inadequacies, which are common to dampers of conventional design, are overcome through the functional integration of the retainer rings 23 with the diaphragm seals 20 during periods of fluid volume change.

It will be recalled that the retainer rings 23 are radially loaded and are formed of a resilient material consequently, increases in fluid pressures cause the convex surfaces of the rings to move toward the diaphragms and to act with greater force against the adjacent face of the surfaces of the diaphragms 20. This increase or greater force increases the sealing effect of the retainer rings, while ring movement serves to increase the volume of the housing or hydraulic chamber. In the event that a fluid pressure decrease is experienced within the housing 10, the retainer rings 23 move toward each other, in directions away from the adjacent faces or surfaces of the diaphragms 20, under the influence of the inherent recovery forces present therewithin, and thereby cause the housing's volume to be decreased. If desired, a bimetal material could be employed in fabricating the retainer rings 23, whereby the magnitude of ring displacement may be increased.

As the "ballooning" of the convolutions 21 comprises a very important function of the convolutions 21, the tension load imposed on the fabric of the diaphragms 20 must be distributed over as great an area as is practical. Due to the continued recycling normally inherent in an operation of the device of the instant invention, the elastic recovery over the area previously loaded must also be accommodated. It will be appreciated that these stretching and recovery requirements are met by the specific retainer rings utilized in the instant invention, particularly when it is recalled that the retainer rings 23 move towards and away from the diaphragms 20, under dictates of fluid pressure changes. This movement or displacement of the rings 23 allows the applied tensile load, applied to the diaphragms, to be distributed substantially throughout the material thereof and also accommodates a contraction or recovery of the stretched resilient material as the rings 23 are displaced toward each other.

Where deemed advisable, an external tubular conduit 30, FIG. 5, may be provided for affording a trimming of the damper D or altering the quantity of fluid F that may be operatively displaced by the piston head 17. The conduit 30 is formed of a malleable material and communicates with the internal portions of the housing 10, adjacent the opposite faces $f_1$ and $f_2$ of the piston head 17. The conduit 30 may be selectively constricted, as by crushing, for example, in order that the flow path established by the conduit may be constricted to limit the rate of fluid flow operatively established therethrough. Hence, it is to be understood that the conduit 30 provides a means for trimming or adjusting the operation of the damper D after it has mounted in operative disposition.

In view of the foregoing it is to be understood that the present invention provides for a damping device wherein the components thereof have been functionally integrated to achieve simplicity, reliability and effectiveness. The invention modifies convention hydraulic systems by integrating the damper components to achieve a sensitive, self-compensating and hermetically sealed damping device, which is particularly adapted for use in systems normally subjected to severe conditions during routine operations.

Obviously many modifications and variations of the present invention are possible in the light of the above teachings. It is therefore to be understood that within the scope of the appended claims the invention may be practiced otherwise than as specifically described.

What is claimed is:

1. An extreme environment, short-stroke, viscous damping device for imposing amplitude attenuation upon high-frequency load motion, comprising in combination:
    a closed, cylindrical housing having an inside diameter of uniform dimension and including means defining a pair of coaxially aligned, concentric openings extending through the opposite ends thereof;
    an elongated reciprocating input shaft extending through the openings in spaced relationship with respect to the surfaces thereof;
    a circular piston head having an outside diameter dimension slightly less than the inside diameter dimension of said housing defining a fluid path therebetween and including a pair of oppositely directed continuous radial faces extending inwardly from the circumference of said piston head and aligned in mutually displaced, parallel planes disposed at right angles with respect to said shaft and displaced inwardly from the adjacent ends of said housing;
    means fixing said head to said shaft in concentric alignment therewith, whereby reciprocating displacement may be imparted to said head as reciprocating forces are applied to said reciprocating input shaft;
    shaft guide means integrally connected with one end of said housing and disposed in displaced, coaxial alignment with respect to the input shaft as it extends through said one end of said housing, whereby said shaft may be pivotally displaced within said guide means;
    a pair of sheet-like convoluted diaphragms formed of a flexible material and having a circular configuration and disposed within said housing adjacent the opposite ends thereof;
    diaphragm mounting means fixedly sealing said pair of diaphragms to said housing and to said shaft with the convolutions thereof extending between the shaft and the surfaces of the openings;
    a hydraulic fluid hermetically sealed within said housing and substantially filling all appreciable voids therein; and
    mounting means adapted for fixedy securing said housing and said shaft between reciprocating load motion input means, whereby the amplitude of reciprocating motion imparted to said load motion input means is attenuated as said shaft is axially displaced and a fluid flow is established across said piston head through said fluid path in response to said displacement.

2. The damping device of claim 1, further characterized in that said diaphragm mounting means includes a pair of concaved resilient ring members disposed within said housing in engagement with said diaphragms adapted to flex under fluid pressures established within said housing for pressing said diaphragms against the ends of said housing and applying a sealing force thereto.

3. The damping device of claim 2 further characterized in that said diaphragm mounting means further includes a pair of tubular abutting members concentrically arranged about said shaft and disposed between said piston head and said diaphragm, each including a concaved face separately engaging a first side surface of a given one of said diaphragms; and
    a pair of stop members each having a convex face arranged in juxtaposed relationship with the second side surface of said diaphragms for confining and sealing each diaphragm between a concave face of an abutting member and the convex face of a stop member.

4. In an extreme environment, short-stroke viscous damping device, the improvement comprising in combination:
    a closed cylindrical housing;
    means defining at opposite ends of said housing a pair of coaxially aligned input shaft-receiving exits;
    an input shaft extending through said exits and spaced from the surfaces thereof adapted to be longitudinally displaced therethrough;
    a pair of flexible, elasticized, sheet-like diaphragms arranged in a mutually spaced relationship adjacent to and extending across the shaft-receiving exits and including means defining coaxially aligned, shaft-receiving openings therein;
    sealing means mounting each diaphragm within said housing in a manner such that each diaphragm is provided with a rolling-fold extended outwardly from said housing and between said shaft and the surfaces of the adjacent exit;
    sealing means sealing each of said diaphragms to the internal end surfaces of said housing and to said shaft, whereby as imparted longitudinal displacement is imparted to said shaft a rolling of the folds will be effected;
    a hydraulic fluid substantially filling said housing; and
    means defining an imperforate, circular piston head arranged between the internal end surfaces of said housing and fixed to said shaft in surrounding relationship therewith and disposed in a manner such that the circumferential surfaces of said piston head is displaced with respect to the longitudinal internal side surface of said housing, for thereby defining a ring-shaped fluid passageway therebetween, whereby the housing is divided into two filled and simultaneously expandable fluid chambers communicating through a continuous passageway surrounding said piston head, and whereby said piston head may be caused to float on the fluid present within and filling said passageway as the shaft is displaced in a direction extending along the longitudinal axis thereof.

5. The device of claim 4 further including means defining at least one filling port extending through said housing adapted to accommodate vacuumizing and fluid introduction operations for filling said housing.

6. The device of claim 5 further characterized in that said sealing means mounting said diaphragms within said housing includes a concave, resilient ring member seated within said housing against one face of each of said diaphragms in a manner such that each diaphragm is secured between a concave surface of a ring and the internal surface of the housing, whereby changes in fluid pressure occurring within the housing tend to distort said rings and enhance deformation of said diaphragms.

7. The device of claim 6 wherein there is provided a malleable tubular conduit arranged adjacent the outer surface of the housing and extending between the chambers, adapted to establish a fluid path communicating therebetween, whereby the quantity of hydraulic fluid operatively displaced between the chambers may be selectively varied.

References Cited by the Examiner
UNITED STATES PATENTS

| | | | |
|---|---|---|---|
| 2,936,860 | 5/1960 | Peras | 188—96 |
| 2,956,797 | 10/1960 | Polhemus | 267—65 |
| 2,980,441 | 4/1961 | Timpner et al. | 267—65 |

FOREIGN PATENTS 1,322,034  2/1963  France.

References Cited by the Applicant
UNITED STATES PATENTS

| | | |
|---|---|---|
| 2,846,983 | 8/1958 | Otto. |
| 2,969,973 | 1/1961 | Scholz. |
| 3,020,981 | 2/1962 | Day. |
| 3,101,937 | 8/1963 | Stearns. |

MILTON BUCHLER, *Primary Examiner.*

G. E. A. HALVOSA, *Assistant Examiner.*